United States Patent
Pande et al.

(10) Patent No.: US 9,780,819 B2
(45) Date of Patent: Oct. 3, 2017

(54) SYSTEM AND METHOD FOR IMPROVING NARROWBAND INTERFERENCE PERFORMANCE

(71) Applicant: TEXAS INSTRUMENTS INCORPORATED, Dallas, TX (US)

(72) Inventors: Tarkesh Pande, Richardson, TX (US); Anuj Batra, Mountain View, CA (US); Il Han Kim, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 15/061,301

(22) Filed: Mar. 4, 2016

(65) Prior Publication Data

US 2017/0257126 A1    Sep. 7, 2017

(51) Int. Cl.
*H04B 1/10* (2006.01)
*H04L 5/00* (2006.01)

(52) U.S. Cl.
CPC .......... *H04B 1/1036* (2013.01); *H04L 5/0007* (2013.01)

(58) Field of Classification Search
CPC .... H04B 1/1036; H04B 1/7107; H04B 15/00; H04B 1/1027; H04B 1/123; H04B 1/71; H04B 1/7102; H04B 1/719; H04B 2001/1063; H04L 5/0007
See application file for complete search history.

(56) References Cited

U.S. PATENT DOCUMENTS

| | | | | |
|---|---|---|---|---|
| 6,074,086 A | * | 6/2000 | Yonge, III | .......... H04L 27/2662 375/260 |
| 2007/0105520 A1 | * | 5/2007 | Van Houtum | ....... H04B 1/7087 455/296 |

* cited by examiner

*Primary Examiner* — Vineeta Panwalkar
(74) *Attorney, Agent, or Firm* — John R. Pessetto; Charles A. Brill; Frank D. Cimino

(57) ABSTRACT

An orthogonal frequency division multiplexing (OFDM) receiver includes detection logic, offset generation logic, tone erasure logic, and correction generation logic. The detection logic is configured to detect a signal containing a block of samples that includes a narrowband interferer from a communication channel. The offset generation logic is configured to align a frequency of the narrowband interferer to a center of a subcarrier frequency of the communication channel to produce an offset signal thereby introducing inter-carrier interference (ICI). The tone erasure logic is configured to remove the subcarrier frequency from the offset signal to produce an interferer erased offset signal. The correction generation logic is configured to remove the ICI to produce an interferer erased signal.

12 Claims, 3 Drawing Sheets

SYSTEM AND METHOD FOR IMPROVING NARROWBAND INTERFERENCE PERFORMANCE

BACKGROUND

Orthogonal frequency-division multiplexing (OFDM) is a method for transmitting and receiving data from one device to another. In OFDM, digital data is encoded on multiple carrier frequencies and transmitted to a receiving device as a block of samples. More specifically, many modulated subcarrier signals are utilized to carry data on multiple parallel channels. Many applications may utilize OFDM. For example, power-line communications (PLC), wireless networks, long term evolution (LTE) communications all utilize OFDM.

One of the challenging aspects of OFDM communications is the presence of narrowband interferers in the channel. Narrowband interferers are unwanted signals that disrupt the reception of the data signal. Conventional systems may utilize windowing to mitigate the effect of narrowband interference (NBI) in multi-carrier modulation systems. Windowing consists of multiplying the time-domain of the transmitted signal by a window function prior to taking a fast Fourier transform (FFT). Multiplication in the time domain is equivalent to convolution in the frequency domain; therefore, the effect of windowing is to reduce the side-lobes produced by the interferer. The extent to which windowing can improve performance depends on the frequency of the interferer. If the interferer does not lie on one of the subcarrier frequencies, spectral leakage occurs, and the NBI affects all neighboring subcarriers.

SUMMARY

The problems noted above are solved in large part by systems and methods for improving NBI performance in OFDM systems. In some embodiments, an OFDM receiver includes detection logic, offset generation logic, tone erasure logic, and correction generation logic. The detection logic is configured to detect a signal containing a block of samples that includes a narrowband interferer from a communication channel. The offset generation logic is configured to align a frequency of the narrowband interferer to a center of a subcarrier frequency of the communication channel to produce an offset signal thereby introducing inter-carrier interference (ICI). The tone erasure logic is configured to remove the subcarrier frequency from the offset signal to produce an interferer erased offset signal. The correction generation logic is configured to remove the ICI to produce an interferer erased signal.

Another illustrative embodiment is a method for reducing NBI effects in OFDM systems. The method may include receiving a signal containing a block of samples that includes a first narrowband interferer from a communication channel. The method may also include aligning a frequency of the first narrowband interferer to a center of a first subcarrier frequency of the communication channel to produce a first offset signal and ICI. The method may also include removing the first subcarrier frequency from the first offset signal to produce a first interferer erased offset signal. The method may also include removing the ICI to produce a first interferer erased signal.

Yet another illustrative embodiment is an OFDM system including a transmitting device, a receiver, and data decode logic. The transmitting device is configured to transmit a signal containing a block of samples that includes a narrowband interferer into a communication channel. The receiver is configured to detect a frequency of the narrowband interferer, align the frequency of the narrowband interferer to a center of a subcarrier frequency of the communication channel to produce an offset signal and ICI, remove the subcarrier frequency from the offset signal to produce an interferer erased offset signal, and remove the ICI to produce an interferer erased signal containing a corrected block of samples. The data decode logic is configured to decode the corrected block of samples.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

NBI is a particular problem of OFDM systems. While windowing may mitigate the effects of NBI by reducing the side-lobes produced by the interferer, the extent to which windowing can improve performance depends on the frequency of the interferer. If the interferer does not lie on one of the subcarrier frequencies, spectral leakage occurs, and the NBI affects all neighboring subcarriers. Therefore, it is desirable to reduce NBI in OFDM systems utilizing measures in addition to or in place of windowing.

In accordance with the disclosed principles, a receiver may receive a signal that includes a block of samples. The receiver is configured to detect any narrowband interferers in the received signal and determine the frequency of the narrowband interferers. In an iterative process, each narrowband interferer is aligned with the center of a subcarrier frequency of the communication channel which introduces ICI into the signal. The subcarrier frequency to which the narrowband interferer is aligned is then removed (i.e., nulled). Therefore, the signal will no longer carry that narrowband interferer. The ICI is then removed from the signal. After all of the narrowband interferers have been removed, the block of samples is decoded for further processing. Hence, all narrowband interferers as well as any potential side lobes are removed from the OFDM signal prior to decoding.

Figure 1:
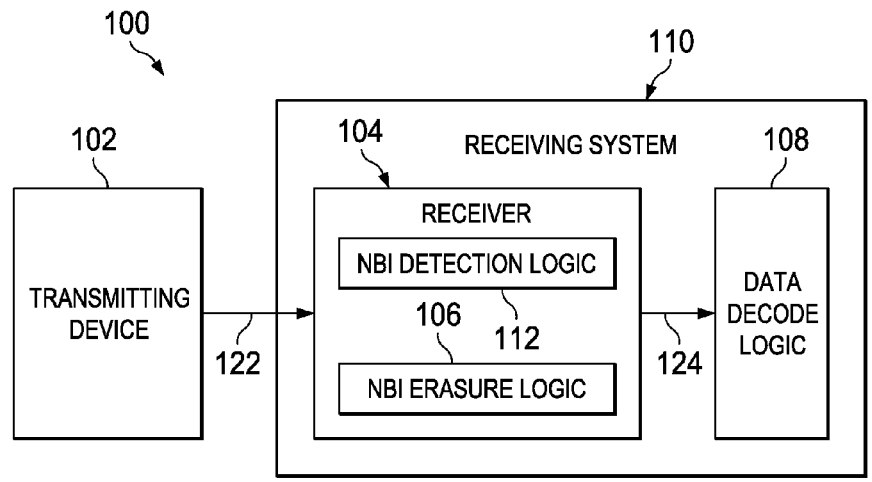
FIG. 1 shows an illustrative block diagram of an OFDM system in accordance with various embodiments.

FIG. 1 shows an illustrative block diagram of OFDM system 100 in accordance with various embodiments. OFDM system 100 may include transmitting device 102 and receiving system 110. Transmitting device 102 may be any device that is capable of transmitting signals utilizing OFDM. For example, transmitting device 102 may be a mobile telephone, a smart meter, a home appliance, a computer, or any other device that may transmit data utilizing OFDM. Transmitting device 102 is configured to transmit data as a block of samples within signal 122 through a communication channel to receiving system 110.

The receiving system 110 is configured to receive the signal 122 from the communication channel and decode the block of samples for further processing. The receiving system 110 may comprise NBI detection logic 112, NBI erasure logic 106, and data decode logic 108. The NBI detection logic 112 is configured to detect the signal 122 in the communication channel. The NBI detection logic 112 then may detect any narrowband interferers that are present within signal 122. Thus, NBI detection logic 112 identifies and/or estimates the frequency at which any narrowband interferers are located within the signal 122. NBI detection logic 112 may utilize any process to identify and/or estimate the frequency of the narrowband interferers.

For example, NBI detection logic 112 may utilize a two-step process for identifying and/or estimating the frequency of the narrowband interferers. The first step of the process may include identifying the corresponding FFT bin index and neighboring FFT bin indices for the narrowband interferer (e.g., the FFT bins on each side of the FFT bin identified as including the narrowband interferer). The NBI detection logic 112 may first determine the average power of signal 122 on all tones. Then, the NBI detection logic 112 may determine a threshold value above the average power of signal 122 that, if exceeded, indicates a narrowband interferer. The threshold level may be predetermined based on the power of narrowband interferers in simulations.

The second step of the example process may include computing the frequency and/or frequency estimate of the narrowband interferer. For instance, if:

$$y_k = x_k + n_k$$

where $y_k$ denotes the received signal 122 in the $k^{th}$ subcarrier, $x_k$ is the transmitted signal 122, and $n_k$ is the noise. Analogizing to an early-late gate synchronizer, the following metric may be constructed to identify and/or estimate the NBI frequency:

$$\text{Metric} = \frac{|Y_{k-1}|^2 - |Y_k|^2}{|Y_{k-1}|^2 + |Y_k|^2}.$$

A plot of the metric as the narrowband interferer is varied from one FFT bin index to the adjacent FFT bin index. Thus, the resulting S-curve is a one-to-one mapping. Hence, based on the metric value computed, the narrowband interferer frequency offset to the nearest bin may be identified and/or estimated. In some examples, this is done utilizing a look-up table, while in other examples, this is done through computation. If done through computation, the following equation may be utilized:

$$\frac{1}{k_1} \log\left(\frac{k_2 + \text{Metric}}{k_3 + \text{Metric}}\right) - k_4$$

where $k_1$, $k_2$, $k_3$, and $k_4$ are pre-configured constants that may be dependent on the signal-to-noise ratio (SNR). In some embodiments, the metric may be a function of the signal power measure on three tones as shown below:

$$\text{Metric} = \frac{|Y_{k+1}|^2 - |Y_{k-1}|^2}{|Y_{k-1}|^2 + |Y_k|^2 + |Y_{k+1}|^2}.$$

The metric is not limited to the examples shown above. Any metric that is a function of the signal power around the narrowband interferer may be constructed. Additionally, instead of the metric being a function of the signal power, the signal magnitude may be utilized to construct the metric.

In some examples, the second step of the process to identify and/or estimate the narrowband interferer frequency may be performed by modulating the data within signal 122 with different frequency offset correction factors and then determining which frequency offset results in the largest signal power at the FFT bin index determined in the first step of the process. Instead of re-computing the FFT, the Goertzel algorithm may be applied, in some embodiments, to the data because only the signal power for a small set of FFT bin indices is required.

The NBI erasure logic 106 is configured to remove the narrowband interferer that was detected by the NBI detection logic 110. The NBI erasure logic 106 generates a corrected signal 124 that does not contain the narrowband interferer. Corrected signal 124 is then received by data decode logic 108. Data decode logic 108 then may decode the corrected samples for further processing.

Figure 2A:
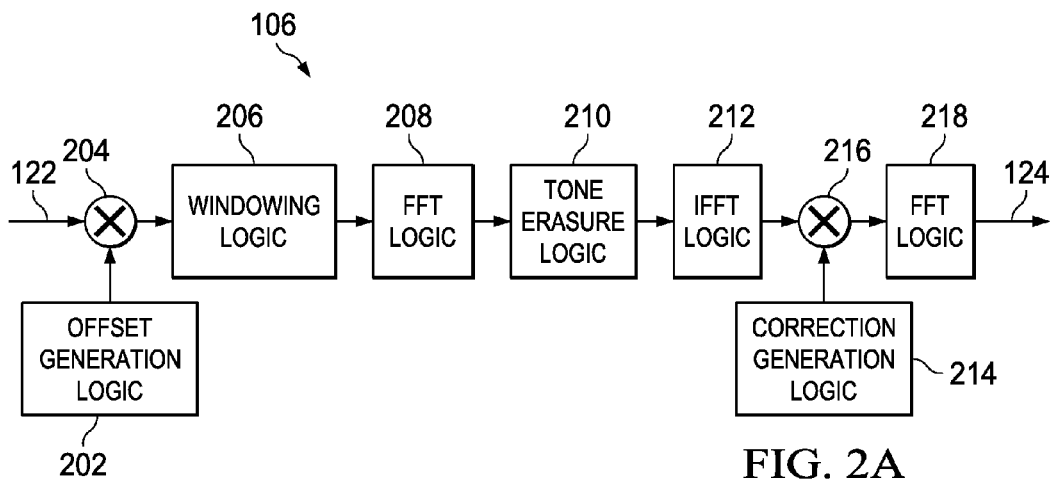
FIG. 2A shows an illustrative block diagram of NBI erasure logic in accordance with various embodiments.

FIG. 2A shows an illustrative block diagram of NBI erasure logic 106 in accordance with various embodiments. NBI erasure logic 106 may include offset generation logic 202, multiplier 204, windowing logic 206, FFT logic 208, tone erasure logic 210, IFFT logic 212, correction generation logic 214, multiplier 216, and FFT logic 218. The offset generation logic 202 is configured to align a frequency of the narrowband interferer to a center of a subcarrier frequency of the communication channel. As discussed previously, the NBI detection logic 112 detects the frequency of the narrowband interferer. The offset generation logic 202 then may determine the difference between the frequency of the narrowband interferer and the center of a FFT bin frequency ($\Delta f_{NBI}$). In some embodiments, the FFT bin frequency chosen to determine this difference is the closest frequency to the narrowband interferer frequency. The offset generation logic 202 is further configured to create a complex sinusoidal for multiplication with the block of samples included in the signal 122. The complex sinusoidal may have a frequency that is the negative of $\Delta f_{NBI}$ (i.e., $-\Delta f_{NBI}$) and may be expressed as $$e^{\frac{-j2\pi\Delta f_{NBI}\cdot n}{F_s}} (n=0,\ldots,N-1)$$

where $F_S$ is the sampling frequency and N is the FFT size. Multiplier 204 is configured to receive the complex sinusoidal from the offset generation logic 202 and the signal 122 that includes the block of samples that has the narrowband interferer. Multiplier 204 then may be configured to multiply the complex sinusoidal with the block of samples included in signal 122 to generate an offset signal. By multiplying this complex sinusoidal with the block of samples, ICI is introduced into the offset signal. In some embodiments, the multiplier 204 is a part of offset generation logic 202.

The windowing logic 206 receives the output of multiplier 204 and is configured to window the received samples. In other words, the windowing logic 206 may be configured to apply a window function to the output of the multiplier 204 to window the output of multiplier 204 to the main lobe of the output. Windowing logic 206 may apply any type of window function including a rectangular window function, a Hanning window function, a Bartlett window, a Fejer window, a Parzen window, or any other windowing function. FFT logic 208 receives the output signal of the windowing logic 206 and is configured to generate the frequency-domain signal by performing a FFT on the windowed signal. Tone erasure logic 210 receives the demodulated FFT signal produced by FFT logic 208 and is configured to remove the subcarrier frequency from which $\Delta f_{NBI}$ was calculated by the offset generation logic 202 from the FFT signal (a derivative of the offset signal generated by multiplier 204) to produce an interferer erased offset signal. In some embodiments, the tone erasure logic 210 may set the FFT bin value to zero for the subcarrier frequency from which $\Delta f_{NBI}$ was calculated. This may be referred to as nulling this specific subcarrier frequency. Because the narrowband interferer has been offset to lie in the center of this subcarrier frequency and the subcarrier frequency is nulled, the interferer is removed from the signal. The interferer removed offset signal generated by the tone erasure logic 210 then is received by IFFT logic 212 which may be configured to generate the time-domain samples by performing an inverse FFT.

To remove the ICI from signal that was introduced due to the multiplication by multiplier 204, correction generation logic 214 generates a phase ramp signal (i.e., a complex sinusoidal) with a frequency that is equal to $\Delta f_{NBI}$ and that is expressed as $$e^{\frac{-j2\pi\Delta f_{NBI}\cdot n}{F_s}} (n=0,\ldots,N-1).$$

In other words, the complex sinusoidal generated by correction generation logic 214 is the complex conjugate signal as the complex sinusoidal generated by offset generation logic 202. The complex sinusoidal generated by correction generation logic 214 may be multiplied with the output signal generated by IFFT logic 212 by multiplier 216. This removes the ICI from the signal. FFT logic 218 then may demodulate the signal generated by multiplier 216 by performing a FFT on that signal to produce the corrected signal 124 for decoding by data decode logic 108.

Figure 2B:
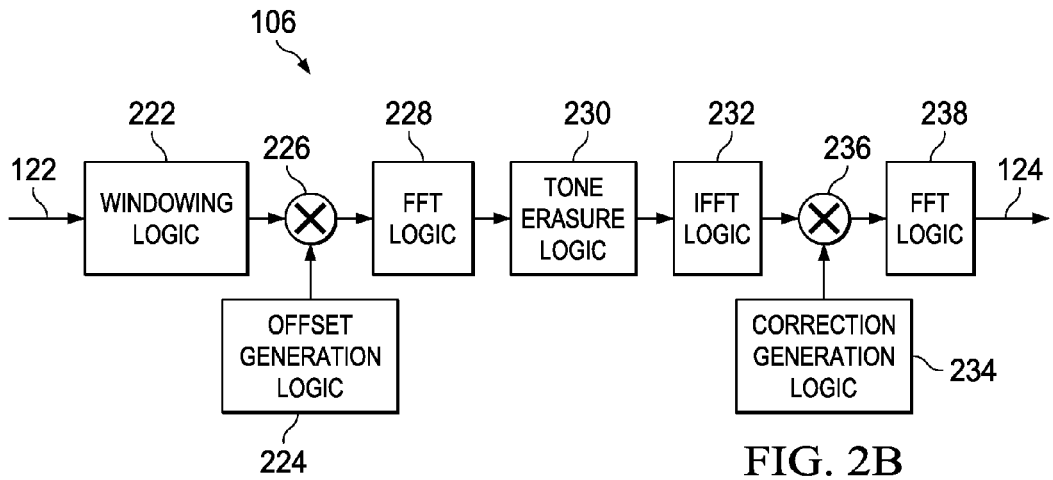
FIG. 2B shows an illustrative block diagram of NBI erasure logic in accordance with various embodiments.

FIG. 2B shows an illustrative block diagram of NBI erasure logic 106 in accordance with various embodiments. NBI erasure logic 106 depicted in FIG. 2B contains the same components as the NBI erasure logic 106 depicted in FIG. 2A except in a different order. For example, the NBI erasure logic 106 depicted in FIG. 2B comprises windowing logic 222, offset generation logic 224, multiplier 226, FFT logic 228, tone erasure logic 230, IFFT logic 232, correction generation logic 234, multiplier 236, and FFT logic 238. Windowing logic 222 acts similarly to windowing logic 206 in that windowing logic 222 may apply any type of window function including a rectangular window function, a Hanning window function, a Bartlett window, a Fejer window, a Parzen window, or any other windowing function; however, the windowing logic 222 applies the window function to the signal 122. The output of windowing logic 222 is multiplied by multiplier 226 with the output of the offset generation logic 224 which generates a complex sinusoidal in the same way as generation logic 202. In some embodiments, the multiplier 226 is a part of offset generation logic 224. The output of the multiplier 226 is an offset signal which becomes a frequency-domain signal using FFT logic 228. Tone erasure logic 230 removes the subcarrier frequency from which $\Delta f_{NBI}$ was calculated by offset generation logic 224 to produce an interferer erased offset signal in the same way that tone erasure logic 210 produces an interferer erased offset signal. IFFT logic 232 generates the time-domain interferer erased offset signal by performing an inverse FFT. To remove the ICI from the signal, correction generation logic 234 generates a phase ramp signal (i.e., a complex sinusoidal) with a frequency that is equal to $\Delta f_{NBI}$ in a similar way as correction generation logic 214. The complex sinusoidal generated by correction generation logic 234 may be multiplied with the output signal generated by IFFT logic 232 by multiplier 236. This removes the ICI from the signal. FFT logic 238 then may generate the frequency-domain signal from the signal generated by multiplier 236 by performing a FFT on that signal to produce the corrected signal 124 for decoding by data decode logic 108.

Figure 2C:
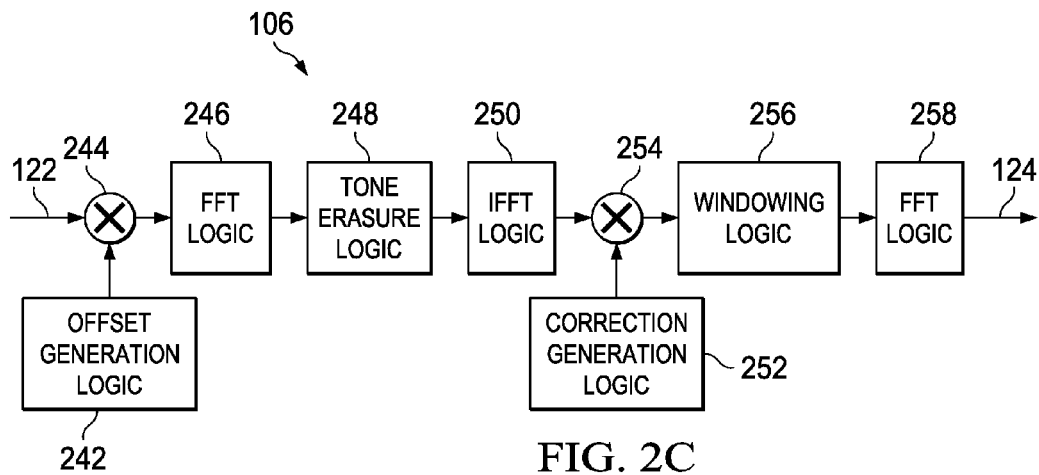
FIG. 2C shows an illustrative block diagram of NBI erasure logic in accordance with various embodiments.

FIG. 2C shows an illustrative block diagram of NBI erasure logic 106 in accordance with various embodiments. NBI erasure logic 106 depicted in FIG. 2C contains the same components as the NBI erasure logic 106 depicted in FIGS. 2A and 2B except in a different order. For example, the NBI erasure logic 106 depicted in FIG. 2C comprises offset generation logic 242, multiplier 244, FFT logic 246, tone erasure logic 248, IFFT logic 250, correction generation logic 252, multiplier 254, windowing logic 256, and FFT logic 258. The signal 122 is multiplied by multiplier 244 with the output of the offset generation logic 242 which generates a complex sinusoidal in the same way as generation logic 202. In some embodiments, the multiplier 244 is a part of offset generation logic 242. The output of the multiplier 244 is an offset signal which becomes a frequency-domain signal using FFT logic 246. Tone erasure logic 248 removes the subcarrier frequency from which $\Delta f_{NBI}$ was calculated by offset generation logic 242 to produce an interferer erased offset signal in the same way that tone erasure logic 210 produces an interferer erased offset signal. IFFT logic 250 generates the time-domain interferer erased offset signal by performing an inverse FFT. To remove the ICI from the signal, correction generation logic 252 generates a phase ramp signal (i.e., a complex sinusoidal) with a frequency that is equal to $\Delta f_{NBI}$ in a similar way as correction generation logic 214. The complex sinusoidal generated by correction generation logic 252 may be multiplied with the output signal generated by IFFT logic 250 by multiplier 254. This removes the ICI from the signal. Windowing logic 256 acts similarly to windowing logic 206 in that windowing logic 256 may apply any type of window function including a rectangular window function, a Hanning window function, a Bartlett window, a Fejer window, a Parzen window, or any other windowing function; however, the windowing logic 256 applies the window function to the output of multiplier 254. FFT logic 258 then may generate the frequency-domain signal from the signal generated by windowing logic 256 by performing a FFT on that signal to produce the corrected signal 124 for decoding by data decode logic 108.

Figure 2D:
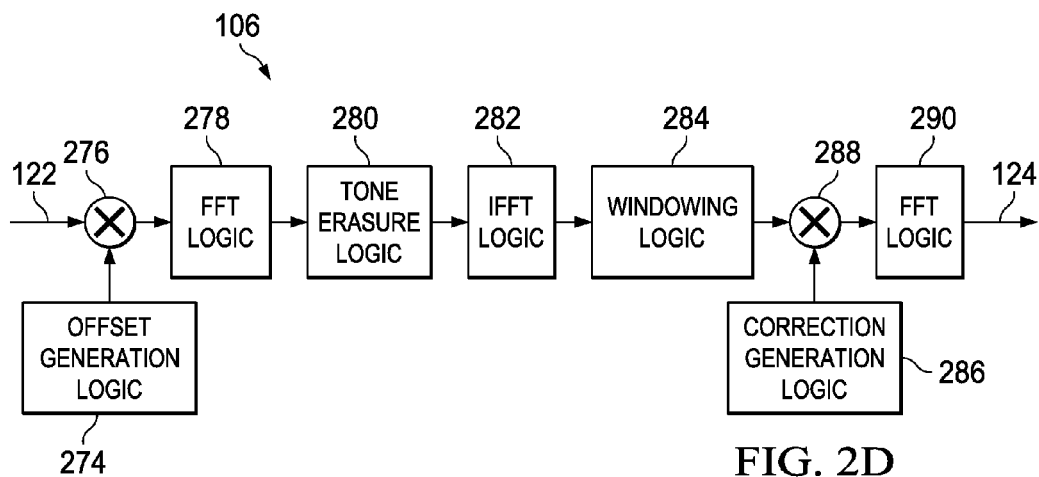
FIG. 2D shows an illustrative block diagram of NBI erasure logic in accordance with various embodiments.

FIG. 2D shows an illustrative block diagram of NBI erasure logic 106 in accordance with various embodiments. NBI erasure logic 106 depicted in FIG. 2D contains the same components as the NBI erasure logic 106 depicted in FIGS. 2A, 2B, and 2C except in a different order. In fact, FIGS. 2A-2D are the same except that the windowing function performed by the windowing logic in each of these embodiments is done at a different time. For example, the NBI erasure logic 106 depicted in FIG. 2D comprises offset generation logic 274, multiplier 276, FFT logic 278, tone erasure logic 280, IFFT logic 282, windowing logic 284, correction generation logic 286, multiplier 288, and FFT logic 290. The signal 122 is multiplied by multiplier 276 with the output of the offset generation logic 274 which generates a complex sinusoidal in the same way as generation logic 202. In some embodiments, the multiplier 276 is a part of offset generation logic 274. The output of the multiplier 276 is an offset signal which becomes a frequency-domain signal using FFT logic 278. Tone erasure logic 280 removes the subcarrier frequency from which $\Delta f_{NBI}$ was calculated by offset generation logic 274 to produce an interferer erased offset signal in the same way that tone erasure logic 210 produces an interferer erased offset signal. IFFT logic 282 generates the time-domain interferer erased offset signal by performing an inverse FFT. Windowing logic 284 acts similarly to windowing logic 206 in that windowing logic 284 may apply any type of window function including a rectangular window function, a Hanning window function, a Bartlett window, a Fejer window, a Parzen window, or any other windowing function; however, the windowing logic 284 applies the window function to the output of IFFT logic 282. To remove the ICI from the signal, correction generation logic 286 generates a phase ramp signal (i.e., a complex sinusoidal) with a frequency that is equal to $\Delta f_{NBI}$ in a similar way as correction generation logic 214. The complex sinusoidal generated by correction generation logic 286 may be multiplied with the output signal generated by windowing logic 284 utilizing multiplier 288. This removes the ICI from the signal. FFT logic 290 then generates the frequency-domain signal from the signal generated by multiplier 288 by performing a FFT on that signal to produce the corrected signal 124 for decoding by data decode logic 108.

Figure 2E:
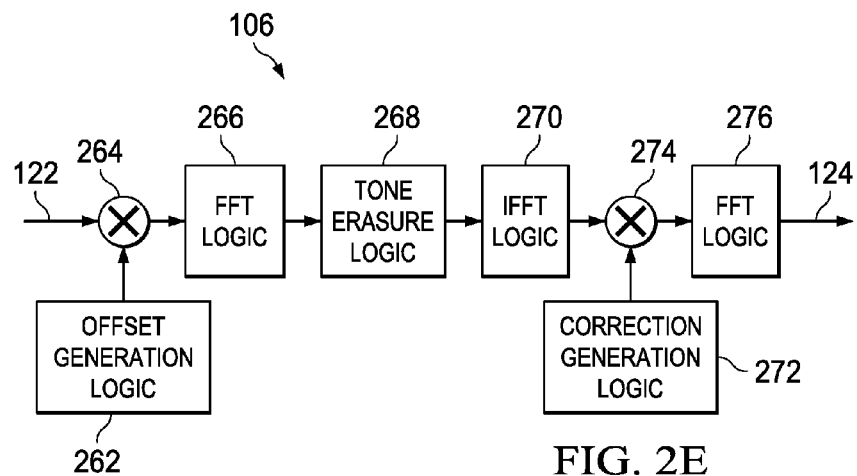
FIG. 2E shows an illustrative block diagram of NBI erasure logic in accordance with various embodiments.

FIG. 2E shows an illustrative block diagram of NBI erasure logic 106 in accordance with various embodiments. NBI erasure logic 106 depicted in FIG. 2D contains the same components as the NBI erasure logic 106 depicted in FIGS. 2A, 2B, 2C, and 2D except that in FIG. 2E no windowing logic is present. For example, the NBI erasure logic 106 depicted in FIG. 2E comprises offset generation logic 262, multiplier 264, FFT logic 266, tone erasure logic 268, IFFT logic 270, correction generation logic 272, multiplier 274, and FFT logic 276. The signal 122 is multiplied by multiplier 264 with the output of the offset generation logic 262 which generates a complex sinusoidal in the same way as generation logic 202. In some embodiments, the multiplier 264 is a part of offset generation logic 262. The output of the multiplier 264 is an offset signal which is becomes a frequency-domain signal using FFT logic 266. Tone erasure logic 268 removes the subcarrier frequency from which $\Delta f_{NBI}$ was calculated by offset generation logic 262 to produce an interferer erased offset signal in the same way that tone erasure logic 210 produces an interferer erased offset signal. IFFT logic 270 generates the time-domain interferer erased offset signal by performing an inverse FFT. To remove the ICI from the signal, correction generation logic 272 generates a phase ramp signal (i.e., a complex sinusoidal) with a frequency that is equal to $\Delta f_{NBI}$ in a similar way as correction generation logic 214. The complex sinusoidal generated by correction generation logic 272 may be multiplied with the output signal generated by IFFT logic 270 by multiplier 274. This removes the ICI from the signal. FFT logic 278 then may generate a frequency-domain signal from the signal generated by multiplier 274 by performing a FFT on that signal to produce the corrected signal 124 for decoding by data decode logic 108.

The ICI removal performed by NBI erasure logic 106 in FIG. 2C may be represented by:

$$y = FWD^H F^H EFDx$$

where:
F is the N×N FFT matrix;
$F^H = [f_0 \ldots f_{N-1}]$ is the corresponding N×N IFFT matrix;

$$D = \text{diag}\left(e^{\frac{-j2\pi \Delta f_{NBI} 0}{F_s}}, \ldots, e^{\frac{-j2\pi \Delta F_{NBI} \cdot (N-1)}{F_s}}\right)$$

is the NBI frequency offset correction matrix to correct frequency by correction generation logic 214, 234, 252, and/or 272;
$W = \text{diag}(w_1, \ldots, w_N)$ is the diagonal matrix with the window coefficients; and
E is the tone erasing matrix which is an Identity matrix (I) with a zero on the diagonal entry which corresponds to the tone that needs to be erased by tone erasure logic 210, 230, 248, and/or 268;
$x = [x_1, \ldots, x_N]^T$ is the time domain of signal 122; and
$y = [y_1, \ldots, y_N]^T$ is the frequency domain after the ICI has been removed (i.e. corrected signal 124).

Thus, the erasure matrix may be expressed as:

$$E = I_N - e_k e_k^H.$$

This allows:

$$y = FWD^H F^H EFDx$$

$$= FWD^H F^H (I_N - e_k e_k^H) FDx$$

$$= FWD^H F^H FDx - FWD^H F^H e_k e_k^H FDx$$

$$= FWx - FWD^H f_k f_k^H Dx$$

$$=FW(I_N-D^H f_k f_k^H D)x$$

$$=FW(I_N-g_k g_k^H)x=FW(x-g_k g_k^H x)$$

where $g_k \underline{\Delta} D^H f_k$. To compute $g_k$, only N multiplications are required because D is a diagonal matrix. The computation of $g_k^H x$ also only requires N multiplications; therefore, complexity is reduced.

Figure 3:
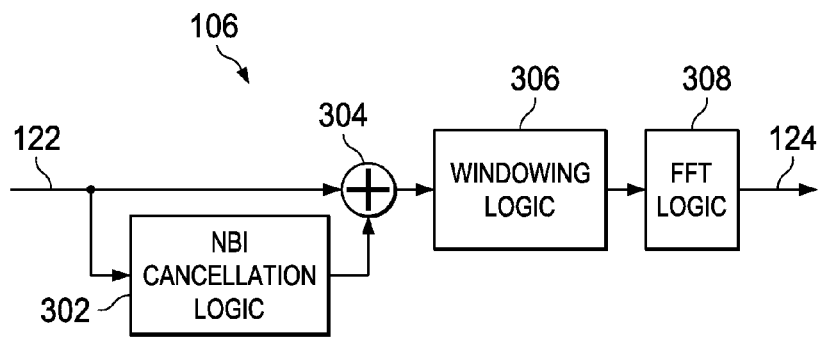
FIG. 3 shows an illustrative block diagram of NBI erasure logic in accordance with various embodiments.

The term $g_k g_k^H x$ may be interpreted as the interference contribution due to the narrowband interferer. This contribution may be computed in the time domain and cancelled (i.e., subtracted) from the signal 122 (i.e., x) prior to windowing and FFT. The complexity shown in FIG. 2B may also be reduced in the same way. FIG. 3 shows an illustrative block diagram of NBI erasure logic 106 in accordance with various embodiments where this contribution is computed and cancelled prior to windowing and FFT. The NBI erasure logic 106 in FIG. 3 comprises NBI cancellation logic 302, adder 304, windowing logic 306, and FFT logic 308. The NBI cancellation logic 302 contains logic including offset generation logic, tone erasure logic, and correction generation logic to compute $g_k g_k^H x$. In other words, the aligning the frequency of the narrowband interferer, the removing the subcarrier frequency from the offset signal, and the removing of the ICI may by the offset generation logic, tone erasure logic, and correction generation logic of FIGS. 2A-E may be performed by computing the interference contribution of the narrowband interferer ($g_k g_k^H x$) in the time domain and subtracting this contribution from the signal 122. Thus, only the frequency location of the narrowband interferer is required to make this computation. The component $g_k g_k^H x$ then may be subtracted from the signal 122 by adder 304 prior to windowing logic 306 performing a window function on the output of adder 304. A FFT is performed by FFT logic 308 on the output of the windowing logic 306 to generate the corrected signal 124.

The process of removing NBI from a signal by introducing ICI may also be utilized to remove multiple narrowband interferers. To remove multiple narrowband interferers, the signal 122 may be iteratively passed through the NBI erasure logic 106 removing one narrowband interferer at a time. The equation for removing multiple narrowband interferers is:

$$y=FW\Pi_{p=1}^P (I_N-g_{k(p)}g_{k(p)}^H)x$$

where P is the total number of narrowband interferers and $g_{k(p)}$ is the p-th corresponding vector defined in $y=FW(I_N-g_k g_k^H)x$.

Figure 4:
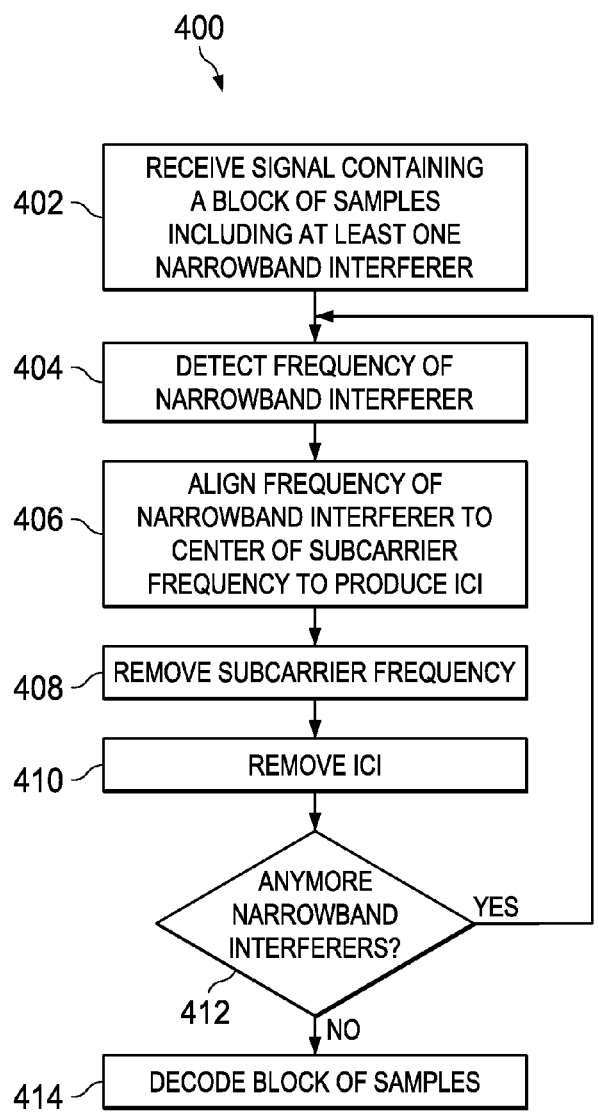
FIG. 4 shows an illustrative flow diagram of a method for reducing NBI effects in OFDM systems in accordance with various embodiments

FIG. 4 shows a flow diagram of a method 400 for reducing NBI effects in OFDM systems in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400, as well as other operations described herein, can be performed by receiving system 110 and implemented by a processor executing instructions stored in a non-transitory computer readable storage medium.

The method 400 begins in block 402 with receiving a signal containing a block of samples that includes at least one narrowband interferer from a communication channel. For example, NBI detection logic 112 within receiver 104 of receiving system 110 may receive signal 122 from transmitting device 102. In block 404, the method 400 continues with detecting the frequency of one of the narrowband interferers, in some examples utilizing NBI detection logic 112. In some embodiments, the frequency of the narrowband interferer is identified and/or estimated utilizing the two-step process discussed above.

The method 400 continues in block 406 with aligning the frequency of one of the narrowband interferers (i.e., the narrowband interferer detected in block 404) to a center of a subcarrier frequency of the communication channel, thereby producing an offset signal and ICI. In some embodiments, the aligning may comprise determining, in some embodiments by offset generation logic 202, 224, 242, 262, and/or NBI cancellation logic 302, the difference between the frequency of the narrowband interferer and the center of a FFT bin frequency and multiplying, in some embodiments by multiplier 204, 226, 244, 264, and/or NBI cancellation logic 302, the block of samples with a sinusoidal having a frequency that is a negative of the difference between the frequency of the narrowband interferer and the center of a FFT bin frequency.

In block 408, the method 400 continues with removing the subcarrier frequency that the narrowband interferer was aligned to from the offset signal to produce an interferer erased offset signal. This may be performed utilizing tone erasure logic 210, 230, 248, 268, and/or NBI cancellation logic 302. The method 400 continues in block 410 with removing the ICI to produce an interferer erased signal. In some embodiments, the removing the ICI may comprise, determining and/or utilizing, in some embodiments by offset generation logic 202, 224, 242, 262, and/or NBI cancellation logic 302, the difference between the frequency of the narrowband interferer and the center of a FFT bin frequency and multiplying, in some embodiments by multiplier 204, 226, 244, 264, and/or NBI cancellation logic 302, the block of samples in the interferer erased signal with a sinusoidal having a frequency that is the difference between the frequency of the narrowband interferer and the center of a FFT bin frequency.

In block 412, the method 400 continues with determining whether there are any additional narrowband interferers in the signal 122. If, in block 412, a determination is made that there are at least one additional narrowband interferers in the signal 122, then the method 400 continues in block 404 with detecting the frequency of one of the additional narrowband interferers. However, if in block 412, a determination is made that there are not any additional narrowband interferers in the signal 122, then the method 400 continues in block 414 with decoding, in some embodiments utilizing data decode logic 108, the block of samples from the corrected signal 124.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for reducing narrowband interference (NBI) effects in orthogonal frequency division multiplexing (OFDM) systems comprising:
   receiving a signal containing a block of samples that includes a first narrowband interferer from a communication channel;
   aligning a frequency of the first narrowband interferer to a center of a first subcarrier frequency of the communication channel to produce a first offset signal and inter-carrier interference (ICI);

removing the first subcarrier frequency from the first offset signal to produce a first interferer erased offset signal; and removing the ICI to produce a first interferer erased signal.

2. The method of claim 1, further comprising:

detecting the frequency of the first narrowband interferer; and detecting a frequency of a second narrowband interferer.

3. The method of claim 2, further comprising:

in response to removing the ICI, aligning the frequency of the second narrowband interferer to a center of a second subcarrier frequency of the communication channel to produce a second offset signal and ICI;

removing the second subcarrier frequency from the second offset signal to produce a second interferer erased offset signal; and removing the ICI to produce a second interferer erased signal.

4. The method of claim 1, further comprising, decoding the block of samples.

5. The method of claim 1, wherein aligning the frequency of the first narrowband interferer comprises:

determining a difference between the frequency of the first narrowband interferer and a center of a fast Fourier transform (FFT) bin frequency; and multiplying the block of samples with a sinusoidal having a frequency that is negative of the difference.

6. The method of claim 1, wherein removing the ICI comprises:

determining a difference between the frequency of the first narrowband interferer and a center of a fast Fourier transform (FFT) bin frequency; and multiplying the first offset signal by a sinusoidal having a frequency that is the difference.

7. The method of claim 1, wherein the aligning the frequency of the narrowband interferer, the removing the subcarrier frequency, and the removing the ICI comprises:

estimating an equivalent interference contribution in a time domain; and subtracting the equivalent interference contribution from the signal.

8. An orthogonal frequency division multiplexing (OFDM) system, comprising:

a transmitting device configured to transmit a signal containing a block of samples that includes a narrowband interferer into a communication channel;

a receiver configured to:

detect a frequency of the narrowband interferer;

align the frequency of the narrowband interferer to a center of a subcarrier frequency of the communication channel to produce an offset signal and intercarrier interference (ICI);

remove the subcarrier frequency from the offset signal to produce an interferer erased offset signal; and remove the ICI to produce an interferer erased signal containing a corrected block of samples; and data decode logic configured to decode the corrected block of samples.

9. The OFDM system of claim 8, wherein the receiver is configured to align the frequency of the narrowband interferer to the center of the subcarrier frequency by:

determining a difference between the frequency of the first narrowband interferer and a center of a fast Fourier transform (FFT) bin frequency; and multiplying the block of samples with a sinusoidal having a frequency that is negative of the difference.

10. The OFDM system of claim 8, wherein the receiver is configured to remove the ICI by:

determining a difference between the frequency of the first narrowband interferer and a center of a fast Fourier transform (FFT) bin frequency; and multiplying the first offset signal by a sinusoidal having a frequency that is the difference.

11. The OFDM system of claim 8, wherein the receiver is configured to detect the frequency of the narrowband interferer by:

identifying the narrowband interferer, a corresponding fast Fourier transform (FFT) bin index, and FFT bin indices neighboring the corresponding FFT bin index; and determining the frequency of the narrowband interferer based on a function of the signal power.

12. The OFDM system of claim 11, wherein the receiver is configured to identify the narrowband interferer by:

determining an average of power of the signal on all tones in the communication channel;

determining a target threshold above the average;

in response to a tone exceeding the target threshold, identifying the tone as the narrowband interferer.

* * * * *